United States Patent
Yarnall, Jr. et al.

(10) Patent No.: US 6,201,477 B1
(45) Date of Patent: *Mar. 13, 2001

(54) SWITCHED CAPACITOR POWER SUPPLY FOR AN ELECTRONIC ANIMAL CONTAINMENT SYSTEM

(76) Inventors: Robert G. Yarnall, Jr.; Robert G. Yarnall, Sr., both of P.O. Box 758, Ford Rd., Kimberton, PA (US) 19442

(*) Notice: Subject to any disclaimer, the term of this patent is extended or adjusted under 35 U.S.C. 154(b) by 0 days.

This patent is subject to a terminal disclaimer.

(21) Appl. No.: 09/460,006

(22) Filed: Dec. 13, 1999

Related U.S. Application Data (63) Continuation-in-part of application No. 09/398,195, filed on Sep. 17, 1999.

(51) Int. Cl.[7] ............................................. G08B 23/00
(52) U.S. Cl. ................................. 340/573.3; 340/573.1; 340/573; 340/539; 340/693; 340/825.4; 340/870.16
(58) Field of Search ................. 340/573.3, 636, 340/539, 573, 573.1, 693, 825.4, 870.16; 119/721, 106; 327/554; 363/60

(56) References Cited

U.S. PATENT DOCUMENTS

| | | | |
|---|---|---|---|
| 4,208,658 | 6/1980 | Fujiki et al. | 343/7 |
| 4,225,206 | 9/1980 | Roman, Jr. | 339/91 R |
| 4,229,724 | 10/1980 | Marcus | 340/23 |
| 4,242,668 | 12/1980 | Herzog | 340/539 |
| 4,297,684 | 10/1981 | Butter | 340/557 |
| 4,371,934 | 2/1983 | Wahl et al. | 364/424 |
| 4,480,310 | 10/1984 | Alvarez | 364/450 |
| 4,656,476 | 4/1987 | Tavtigian | 340/993 |
| 4,733,633 | 3/1988 | Yarnall, Sr. et al. | 119/29 |
| 4,745,882 * | 5/1988 | Yarnall, Sr. et al. | 340/573 |
| 4,898,120 | 2/1990 | Brose | 119/29 |
| 4,967,695 | 11/1990 | Giunta | 119/29 |
| 4,996,945 | 3/1991 | Dix, Jr. | 119/29 |
| 5,067,441 | 11/1991 | Weinstein | 119/29 |
| 5,121,711 * | 6/1992 | Aine | 340/573 |
| 5,161,485 | 11/1992 | McDade | 119/106 |
| 5,170,149 * | 12/1992 | Yarnall, Sr. et al. | 340/573 |
| 5,207,178 | 5/1993 | McDade et al. | 119/29 |
| 5,241,923 | 9/1993 | Janning | 119/721 |
| 5,266,944 | 11/1993 | Carroll et al. | 340/825.36 |
| 5,414,614 * | 5/1995 | Fette et al. | 363/59 |
| 5,425,330 | 6/1995 | Touchton et al. | 119/721 |
| 5,435,271 | 7/1995 | Touchton et al. | 119/721 |
| 5,460,124 | 10/1995 | Grimsley et al. | 119/721 |
| 5,481,447 * | 1/1996 | Caris et al. | 363/60 |
| 5,565,850 | 10/1996 | Yarnall, Jr. et al. | 340/573 |
| 5,610,588 * | 3/1997 | Yarnall, Sr. et al. | 340/573 |
| 5,745,002 * | 4/1998 | Baschirotto et al. | 327/554 |
| 5,769,032 | 6/1998 | Yarnall, Sr. et al. | 119/721 |
| 5,781,113 | 7/1998 | Yarnall, Sr. et al. | 340/573 |
| 5,808,551 * | 9/1998 | Yarnall, Jr. et al. | 340/573 |
| 5,844,489 | 12/1998 | Yarnall, Jr. et al. | 340/573 |
| 5,911,198 | 6/1999 | Curen et al. | 119/720 |

\* cited by examiner

Primary Examiner—Jeffery Hofsass
Assistant Examiner—Hungng Nguyen
(74) Attorney, Agent, or Firm—Ratner & Prestia

(57) ABSTRACT

An electronic containment system for use with animals and/or humans. The system includes a transmitter for transmitting a radio signal, a receiver for receiving the radio signal from the transmitter and a deterrent circuit including a switched capacitor power supply for administering a deterent responsive to a control signal from the receiver. The system also includes a collar or a belt to attach the receiver and the deterrent circuit energized by a switched capacitor power supply to the animal or human.

41 Claims, 9 Drawing Sheets

SWITCHED CAPACITOR POWER SUPPLY FOR AN ELECTRONIC ANIMAL CONTAINMENT SYSTEM

This application is a continuation-in-part of U.S. patent application Ser. No.09/398,195, filed on Sep. 17, 1999, which is pending.

FIELD OF THE INVENTION

The present invention relates to animal and/or human electronic containment systems and, more particularly, to an electronic containment system which includes a radio receiver, with a shock deterrent section energized by a switched capacitor power supply, mounted within or on the animal's collar.

BACKGROUND OF THE INVENTION

One system for accomplishing the confinement of an animal is disclosed in U.S. Pat. No. 5,207,178 entitled ELECTRODE DEVICE FOR AN ELECTRIC SHOCK GENERATOR CARRIED ON AN ANIMAL (the '178 patent), issued to McDade et al. The '178 patent and other similar conventional systems mount a receiver on a collar of an animal. The collar delivers a shock to the animal wearing the collar when the animal is in relatively close proximity to a perimeter antenna wire. This conventional system incorporates an electronic shock circuit that is energized by a large and heavy transformer. This transformer is necessary to produce a shock sufficient to deter the animal from crossing a predetermined boundary. This approach, however, greatly increases the size and weight of the receiver encasement unit.

Another conventional confinement system is described in U.S. Pat. No. 5,241,923 entitled TRANSPONDER CONTROL OF ANIMAL WHEREABOUTS (the '923 patent), issued to Janning. The '923 patent describes a confinement system that utilizes stationary and/or mobile transponders. The transponders are placed to determine the outer containment area of an animal or human. As with the aforementioned prior art, a receiver is mounted on a collar worn by the animal. The collar delivers a shock to an animal wearing the collar when the animal is in relatively close proximity of the transponders. This system also incorporates an electronic shock circuit powered by a large transformer inside the animal's receiver encasement. As such, this system has drawbacks similar to those discussed above.

Yet another system for the confinement of an animal is disclosed in U.S. Pat. No. 4,898,120 entitled ANIMAL TRAINING AND RESTRAINING SYSTEM (the '120 patent), issued to Brose. This system utilizes a centralized transmitter that broadcasts a predetermined radio signal. Unlike the other prior art, the animal must stay in the broadcast containment field. When the animal's receiver detects that the containment field is weakening, as the animal's distance from the transmitter increases, the animal's receiver administers a deterrent to the animal. This system also incorporates an electronic shock circuit powered by a large transformer inside the animal's receiver encasement. As with the other systems, this greatly increases the size and weight of the receiver encasement unit.

Bearing in mind the problems and deficiencies of the prior art, it is therefore an object of the present invention to provide an electronic containment system in which the deterrent circuit eliminates the large shock generating transformer by replacing it with one or more charged capacitors in an animals receiver. The novel switched capacitor shock circuit not only greatly reduces the size and weight of the receiver unit, that is carried or worn by the animal or human, but it also reduces the manufacturing cost.

SUMMARY OF THE INVENTION

The present invention provides an animal confinement system including a base for transmitting a predetermined containment signal; a receiver that is worn by the animal or human being contained; and switched capacitor-shocking circuit.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE PREFERRED EMBODIMENTS

Generally, the confinement system for animals of the present invention operates by transmitting a signal to a receiver mounted on an animal's collar. The receiver then detects the transmitted signal. If the transmitted signal and a reference signal within the receiver are similar, then the signal strength of the transmitted signal is used to determine whether the animal is close to a boundary area. If the transmitted signal and reference signals are not similar, the transmitted signal is ignored. Although the exemplary embodiments illustrate the use of the confinement system by attaching the receiver to an animal, the receiver can also be attached to a person and used as described below.

Figure 1:
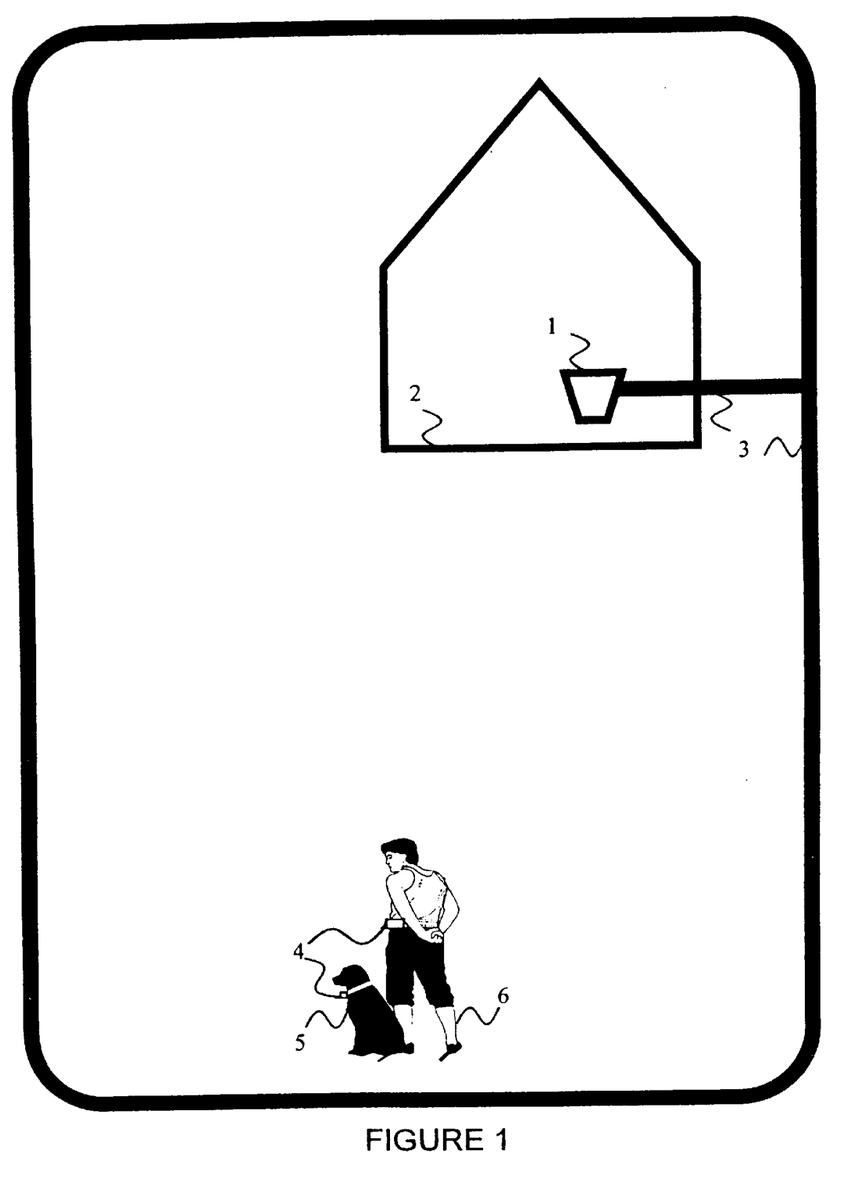
FIG. 1 is an illustration of a first exemplary embodiment of the present invention. This exemplary embodiment utilizes a permanently affixed outer perimeter containment wire attached to a stationary transmitting base station. When the receiver, worn by an animal or human, is in close proximity of the outer wire, the receiver will administer an audio signal and/or shock as a deterrent.

Referring to FIG. 1, a first exemplary embodiment of the present invention is shown. In FIG. 1, TRANSMITTER 1 transmits a predetermined modulated signal of between about 30 kHz and 40 kHz, for example, through permanently affixed ANTENNA 3. In FIG. 1, TRANSMITTER 1 is located in a STRUCTURE 2 such as a house or a garage, for example. ANIMAL 5 and/or HUMAN 6 wears RECEIVER 4 that responds to the predetermined containment signal of TRANSMITTER 1. When ANIMAL 5 and/or HUMAN 6 comes in close proximity with ANTENNA 3 (5–10 feet for example), RECEIVER 4 becomes energized and may emit and an annoying sound, a shock, or an annoying sound and a shock to ANIMAL 5 and/or HUMAN 6. Thus, deterring them from crossing the predetermined containment area (not shown).

Figure 2:
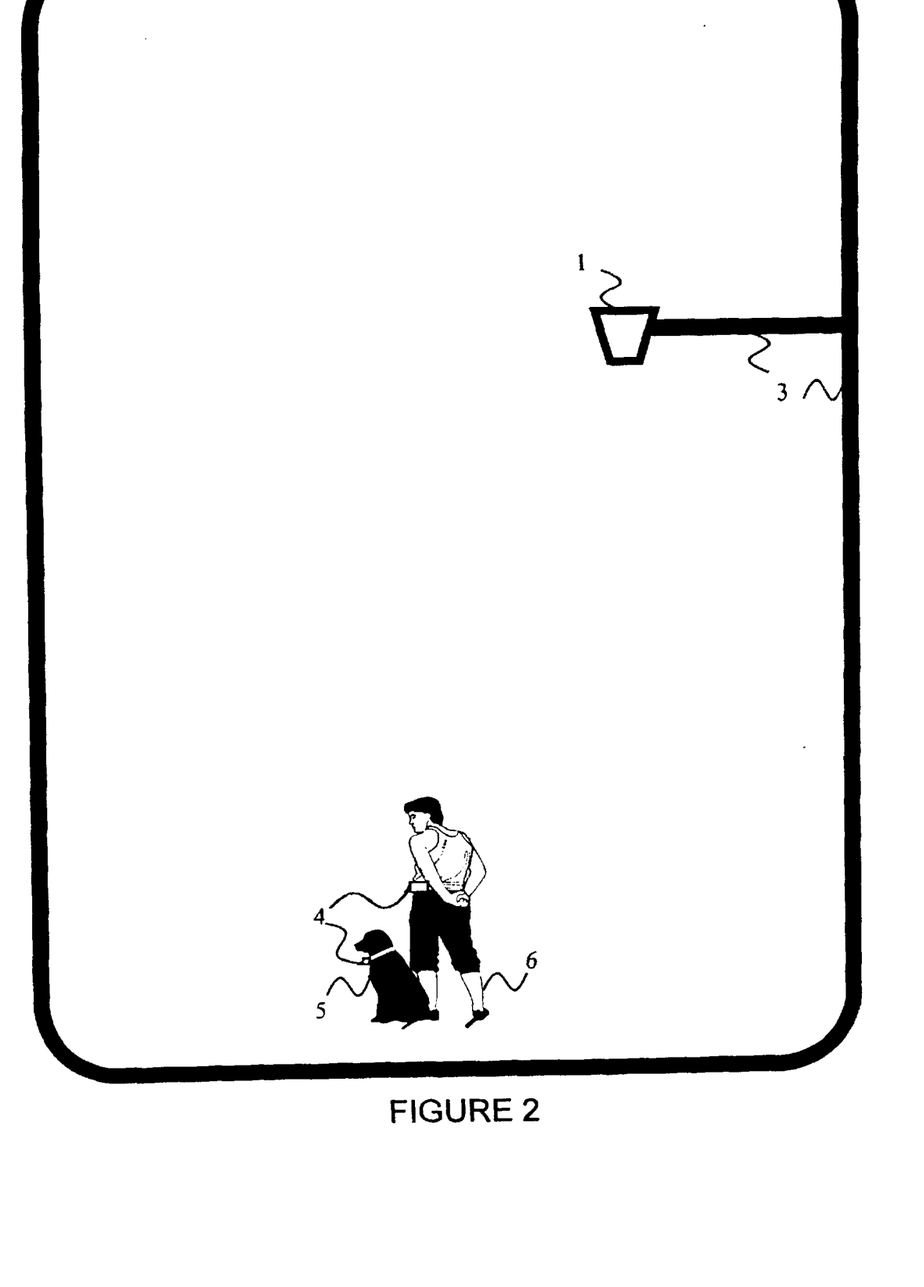
FIG. 2 is an illustration of a second exemplary embodiment of the present invention. This exemplary embodiment utilizes a portable outer perimeter containment wire attached to a mobile transmitting base station. When the receiver, worn by an animal or human, is in close proximity of the outer wire, the receiver will administer an audio signal and/or shock as a deterrent.

Referring to FIG. 2, there is shown a second exemplary embodiment illustrating a portable usage of the invention. In FIG. 2, TRANSMITTER 1 transmits a predetermined modulated signal of between about 30 kHz and 40 kHz, for example, through ANTENNA 3. In FIG. 2, TRANSMITTER 1 is portable and may be placed in an open field, playground, seashore area, etc. ANIMAL 5 and/or HUMAN 6 wears RECEIVER 4 that responds to the predetermined containment signal of TRANSMITTER 1. When ANIMAL 5 and/or HUMAN 6 comes in close proximity of ANTENNA 3 (5 to 10 feet for example), RECEIVER 4 becomes energized and may emit and an annoying sound, a shock, or an annoying sound and a shock to ANIMAL 5 and/or HUMAN 6. Thus, deterring them from crossing the predetermined containment area.

Figure 3:
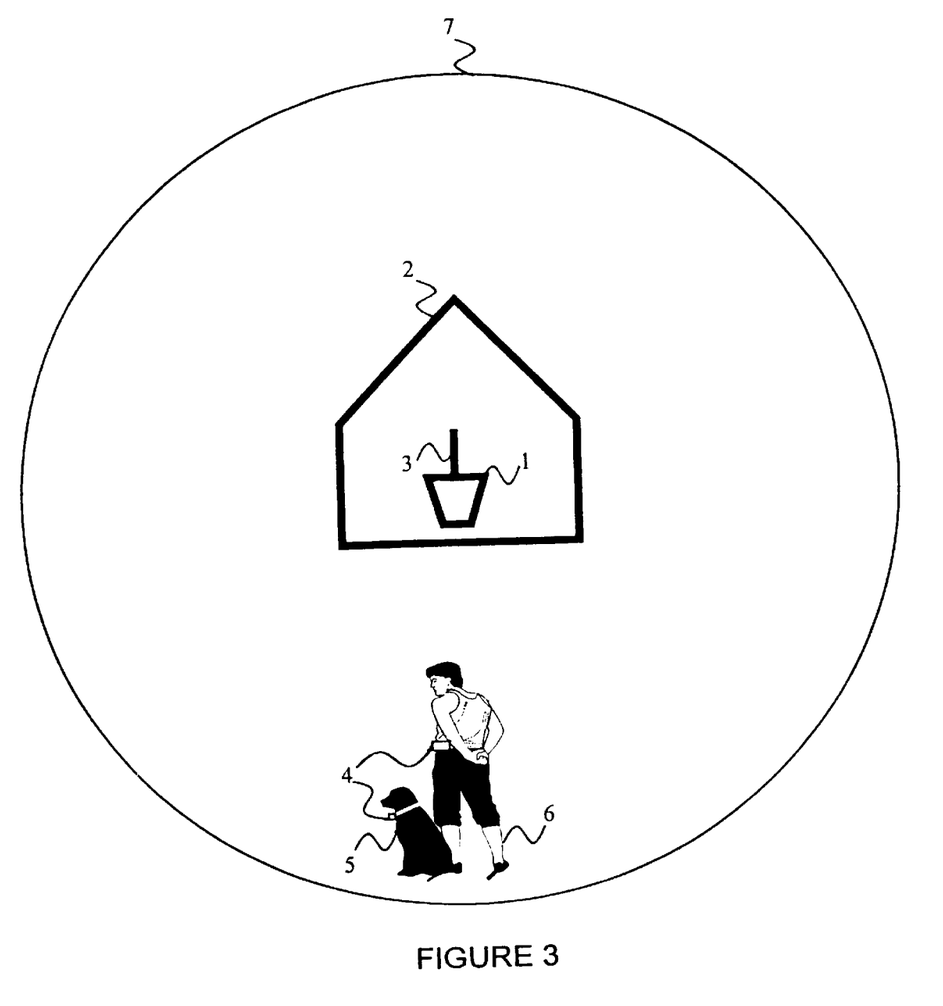
FIG. 3 is an illustration of a third exemplary embodiment of the present invention. This exemplary embodiment utilizes a permanently affixed transmitting antenna and a stationary transmitting base station. When an animal or human, wearing the receiver, ventures away or out of the containment signal, the receiver will administer an audio signal and/or shock as a deterrent.

Referring to FIG. 3, there is shown an alternate portable usage of the present invention. In FIG. 3, TRANSMITTER 1 transmits a predetermined modulated signal of between about 30 kHz and 40 kHz, for example, through ANTENNA 3. TRANSMITTER 1 is located in a STRUCTURE 2 such as a house or a garage, for example. ANIMAL 5 and/or HUMAN 6 wears RECEIVER 4 that responds to the predetermined containment signal of TRANSMITTER 1. Unlike the first and second exemplary embodiments discussed above, the ANIMAL 5 and/or HUMAN 6 must stay within the BROADCAST FIELD 7, (50 to 100 feet from ANTENNA 3, for example). No outer perimeter wire needs to be installed. RECEIVER 4 becomes energized when no containment signal is detected and may emit an annoying sound, a shock, or an annoying sound and a shock to ANIMAL 5 and/or HUMAN 6. Thus, deterring them from crossing the predetermined containment area.

Figure 4:
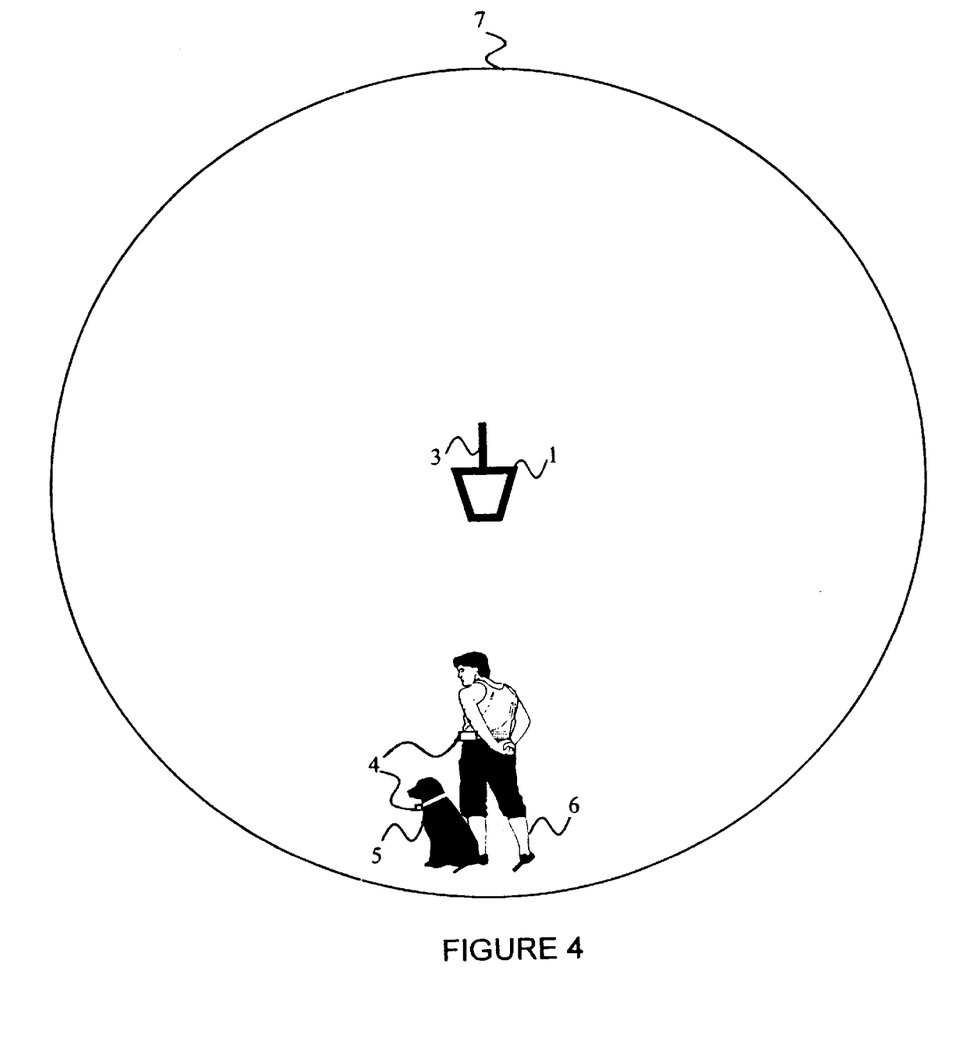
FIG. 4 is an illustration of a fourth exemplary embodiment of the present invention. This exemplary embodiment utilizes a portable outer perimeter containment wire attached to a mobile transmitting base station. When an animal or human, wearing the receiver, ventures away or out of the containment signal, the receiver will administer an audio signal and/or shock as a deterrent.

Referring to FIG. 4, there is shown another alternate portable usage of the present invention. In FIG. 4, TRANSMITTER 1 transmits a predetermined modulated signal of between about 30 kHz and 40 kHz, for example, through ANTENNA 3. TRANSMITTER 1 is portable and may be placed in an open field, playground, seashore area, etc. ANIMAL 5 and/or HUMAN 6 wears RECEIVER 4 that responds to the predestinated containment signal of TRANSMITTER 1. Unlike the first and second exemplary embodiments, the ANIMAL 5 and/or HUMAN 6 must stay within the BROADCAST FIELD 7, (50 to 100 feet from ANTENNA 3, for example). No outer perimeter wire needs to be installed. RECEIVER 4 becomes energized when no containment signal is detected and may emit an annoying sound, a shock, or an annoying sound and a shock to ANIMAL 5 and/or HUMAN 6. Thus, deterring them from crossing the predetermined containment area.

Figure 5:
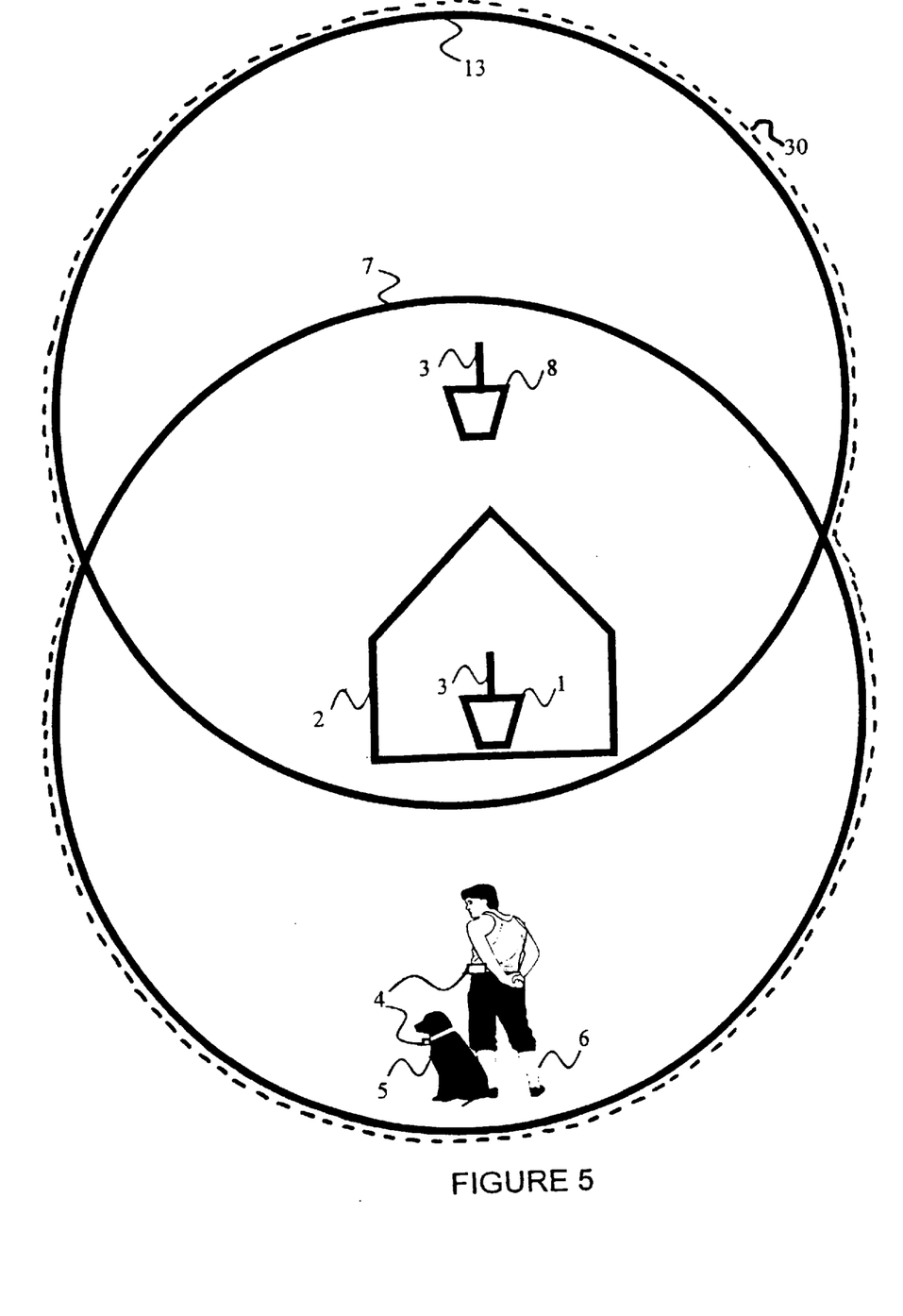
FIG. 5 is an illustration of a fifth exemplary embodiment of the present invention. This exemplary embodiment utilizes multiple transmitters to extend the containment field. When an animal or human, wearing the receiver, ventures away or out of the containment signal, the receiver will administer an audio signal and/or shock as a deterrent.

FIG. 5 illustrates a fifth exemplary embodiment of the present invention. In FIG. 5, additional portable transmitters 8 may be placed to extend the containment field. As each additional transmitter 8 generates its own containment field 13, proper placement of additional transmitters 8, such that their respective containment fields overlap one another, provides a single larger containment field 30. The size and shape of the containment field 30 may be adjusted by moving transmitters 1 and/or 8 as desired.

Figure 6:
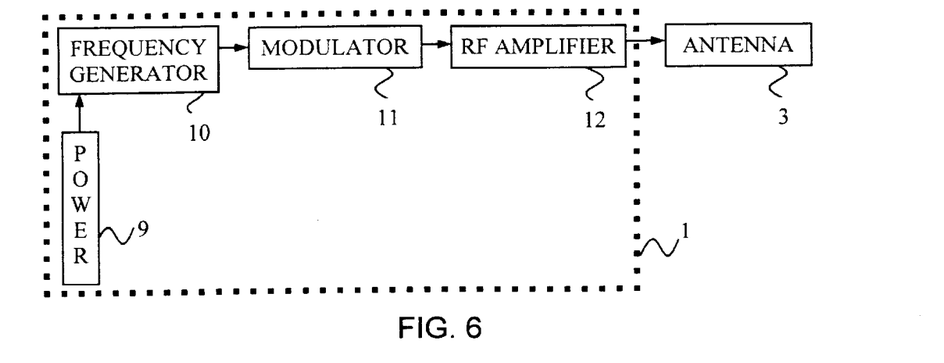
FIG. 6 is a containment transmitter according to an exemplary embodiment of the present invention.

Referring to FIG. 6, a block diagram of a transmitter according to an exemplary embodiment of the present invention is shown. In FIG. 6, TRANSMITTER 1 consists of POWER SOURCE 9, FREQUENCY GENERATOR 10, MODULATOR 11 and RF AMPLIFIER 12. A modulated RF signal of between about 30 kHz and 40 kHz, and preferably about 33.4 kHz, for example, is broadcast by TRANSMITTER 1 thought ANTENNA 3 as a containment field signal.

Figure 7:
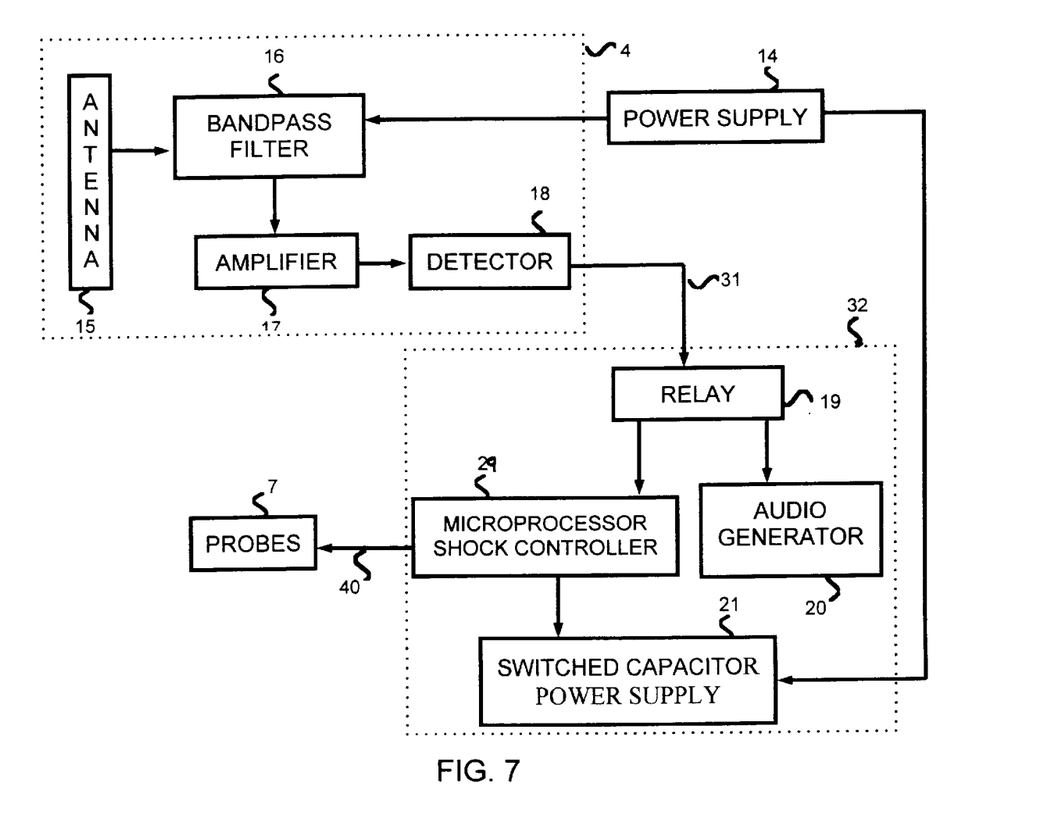
FIG. 7 is a block diagram of a receiver worn by the animal or human according to an exemplary embodiment of the present invention.

Referring to FIG. 7, a block diagram of a receiver and a deterrent circuit according to an exemplary embodiment of the present invention is shown. In the exemplary embodiment, RECEIVER 4 includes POWER SUPPLY 14, ANTENNA 15, BANDPASS FILTER 16, AMPLIFIER 17 and DETECTOR 18, and DETERRENT CIRCUIT 32 includes RELAY 19, AUDIO GENERATOR 20, MICROPROCESSOR SHOCK CONTROLLER 29, SWITCHED CAPACITOR POWER SUPPLY 21, and PROBES 7.

In FIG. 7, POWER SUPPLY 14 (which may be a battery, for example) supplies sufficient power to energize RECEIVER 4. It is also contemplated that POWER SUPPLY 14 may provide power to SWITCHED CAPACITOR POWER SUPPLY 21, either directly or through RELAY 19 and MICROPROCESSOR SHOCK CONTROLLER 29. ANTENNA 15 picks up the modulated RF signal transmitted by TRANSMITTER 1 as the animal nears the outer loop (formed by ANTENNA 3, for example). The signal then passes through BANDPASS FILTER 16. BANDPASS FILTER 16 preferably eliminates frequencies above and below those used by the confinement system. In the exemplary embodiment of FIG. 7, 34 kHz is chosen as the upper limit of BANDPASS FILTER 16 and 33 kHz is chosen as the lower limit. Alternatively, a pair of band rejection filters having frequencies of 33 kHz and 34 kHz, respectively, may also be used. In general, any filtering scheme capable of limiting the frequency range of the signal passing through the remainder of RECEIVER 4 may be used.

Referring again to FIG. 7, the output signal from BAND-PASS FILTER 16 is provided as an input to AMPLIFIER 17. The amplified signal output by AMPLIFIER 17 is sent to DETECTOR 18. DETECTOR 18, which may be a phase detector for example, detects the presence of the known frequency (33.4 kHz, for example) of the containment signal sent by TRANSMITTER 1, and produces, as an output, a control signal 31 to RELAY 19. RELAY 19 is utilized to trigger AUDIO GENERATOR 20, which emits an unpleasant sound to the animal (for example, a dog whistle). Additionally, RELAY 19 controls MICROPROCESSOR SHOCK CONTROLLER 29, which, in turn, controls at least one of several the current paths into SWITCHED CAPACITOR POWER SUPPLY 21.

SWITCHED CAPACITOR POWER SUPPLY 21 produces an output pulse 40 of sufficient voltage and current so as to give the animal a mild electrical shock via PROBE 7. In the exemplary embodiment, the output pulse 40 may be between about 2 kV and 12 kV depending on the level of shock deterrent desired. In the operation of the present invention, RELAY 19 may be set to operate only AUDIO GENERATOR 20, MICROPROCESSOR SHOCK CONTROLLER 29, or a combination of AUDIO GENERATOR 20 and MICROPROCESSOR SHOCK CONTROLLER 29.

DETECTOR 18 may either be set at time of manufacture to activate MICROPROCESSOR SHOCK CONTROLLER 29 only in the presence of the predetermined containment signal (as discussed in the first and second exemplary embodiments), or may be set at time of manufacture to activate MICROPROCESSOR SHOCK CONTROLLER 29 only in the absence of the predetermined containment signal (as discussed in the third and fourth exemplary embodiments). It is also contemplated that the Detector 18 may be set by the user after manufacturing to activate the MICROPROCESSOR SHOCK CONTROLLER 29 based on either the presence or absence of the predetermined containment signal.

Figure 8:
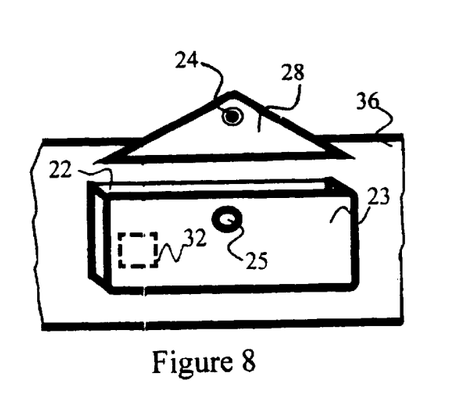
FIG. 8 is a view of a containment collar arrangement illustrating an exemplary embodiment of a housing for use with the collar.

FIG. 8 illustrates an exemplary embodiment for encasing the RECEIVER 4 and/or DETERRENT CIRCUIT 32 within collar 36. In FIG. 7, DETERRENT CIRCUIT 32 (including SWITCHED CAPACITOR POWER SUPPLY 21) may be placed in AREA 22 of POUCH 23, which is part of COLLAR 36. Lifting FLAP 28 allows access to AREA 22. Outer SNAP 24 is pressed into inner SNAP 25 to secure RECEIVER 4 and/or DETERRENT CIRCUIT 32 within the collar 36. As mentioned above, RECEIVER 4 is housed separately from POWER SUPPLY 14. Therefore, in order to encase both DETERRENT CIRCUIT 32 and RECEIVER 4, separate pouches 23 are needed for each.

Figure 9:
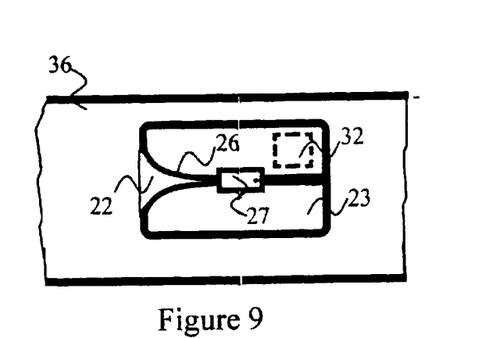
FIG. 9 is a view of a containment collar arrangement illustrating another exemplary embodiment of a housing for use with the collar.

FIG. 9 illustrates another exemplary embodiment for encasing the RECEIVER 4 and/or DETERRENT CIRCUIT 32 within collar 36. In FIG. 9, DETERRENT CIRCUIT 32 may be placed in AREA 22 that is surrounded by POUCH 23. AREA 22 may be accessed by pulling TAB 27 of ZIPPER 26 to secure RECEIVER 4 and/or DETERRENT CIRCUIT 32 within the collar 36. As above, separate pouches 23 are needed for RECEIVER 4 and DETERRENT CIRCUIT 32.

Figure 10:
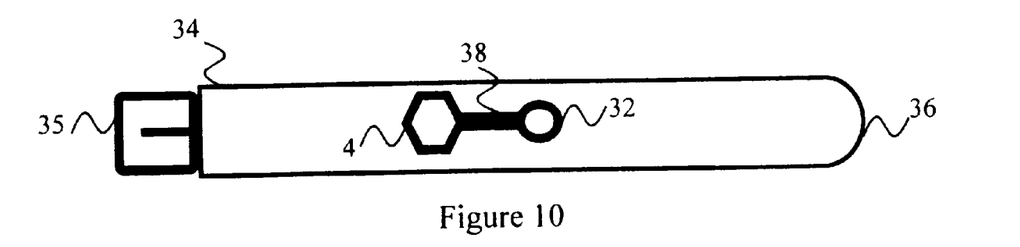
FIG. 10 is a plan view of a containment collar arrangement in which the power source is not within with the receiver encasement.

FIG. 10 is a plan view of another exemplary embodiment of collar 36 and its components. In FIG. 10, collar BUCKLE 35 is used to secure the collar 36 to the animal 5 or person 6 (not shown). BELT 34 is the outer layer of collar 36 where RECEIVER 4 and DETERRENT CIRCUIT 32 are attached. RECEIVER 4 and DETERRENT CIRCUIT 32 are electrically connected to one another through WIRES 38. BELT 34 may be comprised of leather, cloth, nylon, plastic, or any material that has the ability to be fashioned into a collar.

Figure 11:
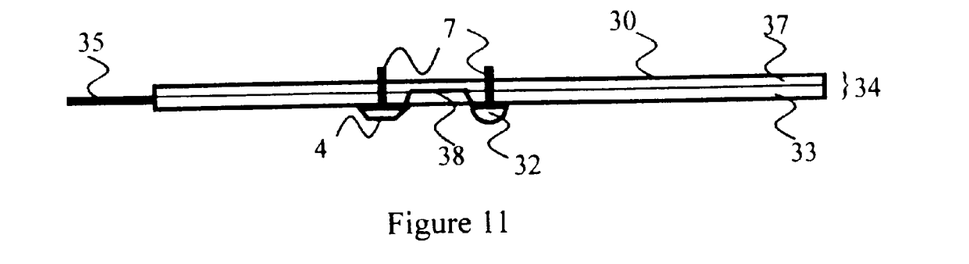
FIG. 11 illustrates the placement of the receiver and the power source affixed to the outside of the collar.

FIG. 11 is a side view of another exemplary embodiment of collar 36 and its components. In FIG. 11, RECEIVER 4 and DETERRENT CIRCUIT 32 are attached to the outside of belt 34. Electrical connection WIRES 38 are placed between outer BELT LAYER 33 and inner BELT LAYER 37. PROBES 7 are attached to the outside of inner BELT LAYER 37 to administer an electric shock to the animal 5 or human 6.

Figure 12:
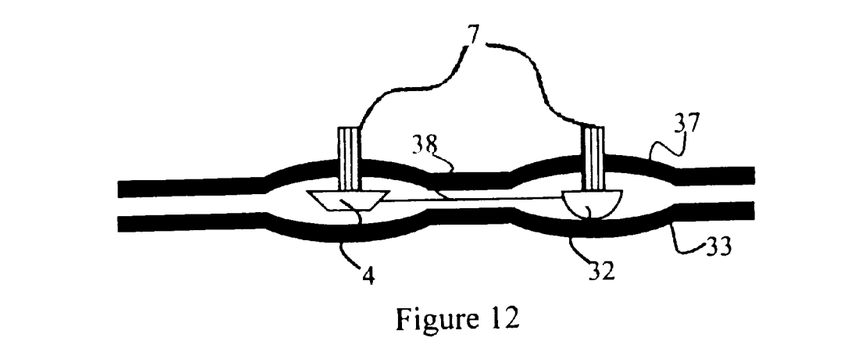
FIG. 12 illustrates an alternate placement of the receiver and the power source within of the collar.

FIG. 12 is a side view of yet another exemplary embodiment of collar 36 and its components. In FIG. 12, RECEIVER 4, DETERRENT CIRCUIT 32 and electrical connection WIRES 38 are placed between outer BELT LAYER 33 and inner BELT LAYER 37. PROBES 7 are attached to the outside inner BELT LAYER 37 to administer an electric shock to the animal 5 or human 6. This approach allows COLLAR 36 to be made so as to have a lower profile that collars in which the receiver and power supply are collocated or contained in a single housing.

Figure 13:
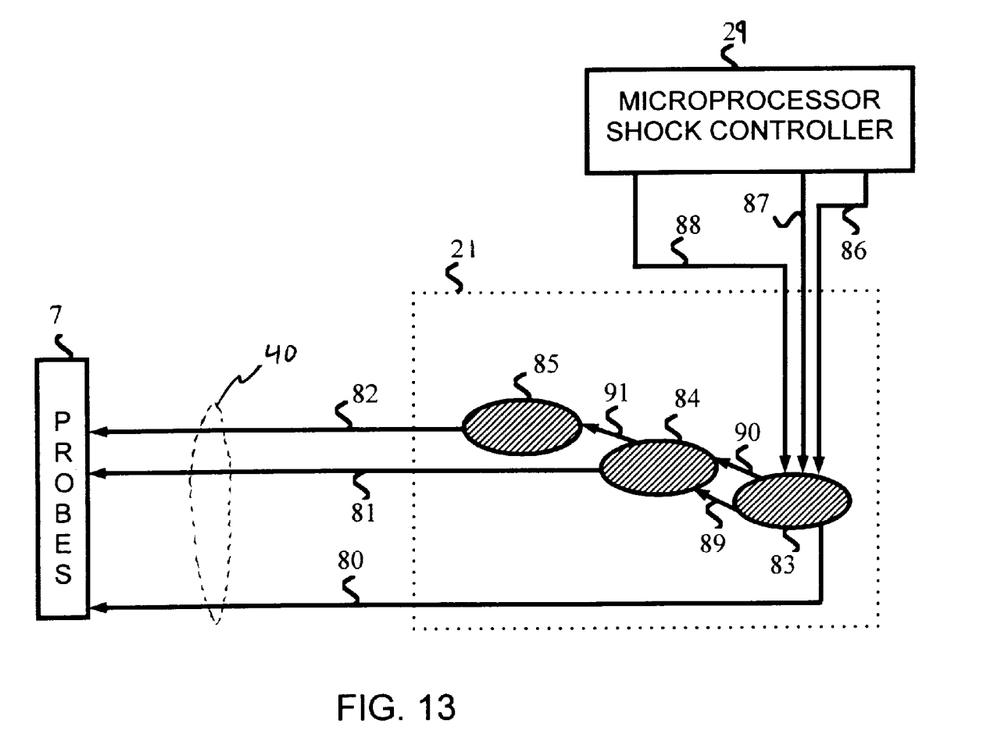
FIG. 13 is a block diagram of a switched capacitor power supply used to energize the shock deterrent section of the receiver worn by the animal or human according to an exemplary embodiment of the present invention.

FIG. 13 illustrates an exemplary embodiment of SWITCHED CAPACITOR POWER SUPPLY 21. In FIG. 13, MICROPROCESSOR SHOCK CONTROLLER 29 selectively controls shock deterrent paths 80, 81, and/or 82 (collectively output pulse 40) through control signal 86, 87 and/or 88. The selection of shock deterrent paths 80, 81, and/or 82 controlled by MICROPROCESSOR SHOCK CONTROLLER 29 may be set during production. It is also contemplated that the user may determine which shock deterrent paths 80, 81, and/or 82 are controlled by MICROPROCESSOR SHOCK CONTROLLER 29 after manufacture.

As shown in FIG. 13, control signals 86, 87 and 88, which are directly related to the rating of power supply 14, activate one or more of multipliers 83, 84, and 85. Multipliers 83, 84, and/or 85, which may include storage capacitors, in response to the control signals 86, 87 and 88, store and multiply energy supplied by POWER SUPPLY 14, (either directly or via MICROPROCESSOR SHOCK CONTROLLER 29) and then release the stored energy when the multiplier approximately reaches a maximum storage level. The released energy is provided to PROBES 7 and produces a shock sufficient to deter the animal or human from leaving the predetermined confinement area (shown in FIGS. 1–5). When multipliers 83, 84, and/or 85 are connected in series, as shown by interconnections 89, 90 and 91, the level of the deterrent signal is greatly increased. It is contemplated that the multiplication value of each of multipliers 83, 84, and 85 may be between about 200 and 300, and preferably about 222. It is also contemplated that multipliers 83, 84 and 85 have a low profile as compared to conventional transformer based designs so as to provide a compact design.

In the exemplary embodiment, the value of power supply 14 is about 9 volts DC, each control signals 86, 87 and 88 has a value of about 9 volts DC, and each multiplier 83, 84 and 85 has a multiplication factor of 222. As such, shock deterrent path 80 has a value of about 2 kV, shock deterrent path 81 has a value of about 4 kV (due to the addition of multipliers 83 and 84), and shock deterrent path 82 has a value of about 6 kV (due to the addition of multipliers 83, 84 and 85).

Although the above describes a deterrent system contained in a collar, it is contemplated that the deterrent system may be included in a belt or the like for use by a human.

As described above, the present invention provides a lower profile collar in which weight and size are more uniformly distributed along the collar of an animal or a belt worn by a human.

Although the invention is illustrated and described herein, the invention is not intended to be limited to the details shown. Rather, various modifications may be made in the details within the scope and range of equivalents of the claims and without departing from the invention.

What is claimed:

1. A deterrent circuit for use with a containment system for an animal or a human, the containment system including a transmitter for transmitting a predetermined radio signal and a receiver for receiving the radio signal from the transmitter, the deterrent circuit comprising:
   a switched capacitor power supply for administering a deterrent, the switched capacitor power supply responsive to a control signal from the receiver,
   wherein a profile of the deterrent circuit is reduced.

2. A deterrent circuit according to claim 1, further comprising a controller coupled between the receiver and the switched capacitor power supply, the controller selecting at least one of a plurality of deterrent levels responsive to the control signal from the reciever.

3. A deterrent circuit according to claim 2, wherein the switched capacitor power supply includes a plurality of mulitpliers, said plurality of mulitpliers providing the plurality of deterrent levels responsive to output signals from the controller.

4. A deterrent circuit according to claim 3, wherein each of the plurality of mulitpliers multiplies a respective output signal from the controller by a predetermined value of between about 200 and 300.

5. A deterrent circuit according to claim 3, wherein each of the plurality of mulitpliers mulitpliers a respective input signal by a predetermined value of about 222.

6. A deterrent circuit according to claim 5, wherein the plurality of mulitpliers are connected in series.

7. A deterrent circuit according to claim 3, wherein each of the plurality of multipliers include at least one capacitor.

8. An electronic containment system for use with one of an animal and a human, the system comprising:
   transmitter for transmitting a predetermined radio signal;
   a receiver for receiving the radio signal from the transmitter; and
   a switched capacitor power supply for administering a deterrent, the switched capacitor power supply responsive to a control signal from the receiver,
   wherein a profile of the receiver and switched capacitor power supply deterrent circuit is reduced.

9. An electronic containment system according to claim 8, further comprising a power source to provide power to the receiver and the switched capacitor power supply.

10. An electronic containment system according to claim 9, wherein the power source may be sepreate from the receiver.

11. An electronic containment system according to claim 8, further comprising attaching means for attaching the receiver and the power supply to one of the animal and the human.

12. An electronic containment system according to claim 11, wherein the receiver is attached to an inside portion of the attaching means.

13. An electronic containment system according to claim 8, wherein the switched capacitor power supply is coupled to an inside portion of the attaching means.

14. An electronic containment system according to claim 11, wherein the attaching means is one of a collar and a belt worn by one of the animal and the human.

15. An electronic containment system according to claim 11, further comprising an encasement coupled to a surface of the attaching means, the switched capacitor power supply coupled to an inside portion of the encasement.

16. An electronic containment system according to claim 15, further comprising closing means for closing the encasement.

17. An electronic containment system according to claim 15, further comprising a second encasement separate from the first encasement, and coupled to the surface of the attaching means, the receiver coupled to an inside portion of the second encasement.

18. An electronic containment system according to claim 17, further comprising closing means for closing the second encasement.

19. An electronic containment system according to claim 8, wherein the radio signal defines a confinement area, and the receiver generates the control signal responsive to the radio signal transmitted by the transmitter.

20. An electronic containment system according to claim 19, further comprising:
   a further transmitter placed at least one of i) below ground level, ii) above ground level and iii) at ground level, the further transmitter providing an additional containment area.

21. An electronic containment system according to claim 20, wherein at least a portion of the additional containment area overlaps at least a portion of the containment area.

22. An electronic containment system according to claim 20, wherein the further transmitter is at least one of a stationary and a portable transmitter.

23. An electronic containment system according to claim 8, wherein the receiver is activated and applies the deterrent when the receiver detects an absence of the predetermined radio signal broadcast by the transmitter.

24. An electronic containment system according to claim 8, wherein the receiver generates the control signal to the switched capacitor power supply when one of the animal and the human attempts to leave a predetermined containment area defined by the radio signal.

25. An electronic containment system according to claim 8, wherein the deterent is at least one of an audible signal and a shock.

26. An electronic containment system according to claim 8, further comprising:
   at least one permanently affixed antenna coupled to the transmitter, the at least one antenna including at least one of i) a wire placed one of below and above ground level to define a containment area for at least one of the animal and the human being contained, and ii) an antenna pod placed at a perimeter of the containment area.

27. An electronic containment system according to claim 26, wherein the receiver is activated and generates the control signal to the deterrent circuit when the receiver detects a predetermined containment signal emitted by the perimeter antenna pod.

28. An electronic containment system according to claim 26, wherein the antenna pod is i) at least one antenna pod and ii) one of a portable antenna pod and a fixed antenna pod.

29. An electronic containment system according to claim 8, wherein a plurality of predetermined deterrent levels may be set to provide multiple deterrent settings.

30. An electronic containment system according to claim 8, further comprising a controller coupled between the receiver and the switched capacitor power supply, the controller selecting at least one of a plurality of deterrent levels responsive to the control signal from the reciever.

31. An electronic containment system according to claim 30, wherein the controller includes a microprocessor.

32. A deterrent circuit according to claim 30, wherein the switched capacitor power supply includes a plurality of mulitpliers, said plurality of mulitpliers providing the plurality of deterrent levels.

33. A deterrent circuit according to claim 32, wherein each of the plurality of mulitpliers multiplies a respective input signal by a predetermined value of between about 200 and 300.

34. A deterrent circuit according to claim 32, wherein each of the plurality of mulitpliers mulitpliers a respective input signal by a predetermined value of about 222.

35. A deterrent circuit according to claim 32, wherein the plurality of mulitpliers are connected in series.

36. A deterrent circuit according to claim 32, wherein each of the plurality of multipliers include at least one capacitor.

37. An electronic containment system according to claim 8, wherein the receiver includes a detector to detect one of i) a presence and ii) an absence of the predetermined radio signal from the transmitter, the detector generating the control signal responsive to the detection.

38. An electronic containment system according to claim 37, wherein the generation of the control signal by the detector is predetermined during manufacture of the detector.

39. An electronic containment system according to claim 37, wherein the generation of the control signal by the detector is determined after manufacture of the detector by a user of the containment system.

40. A containment system for an animal or a human, the containment system including a transmitter for transmitting a predetermined radio signal, the containment system further comprising:

a receiver for receiving the radio signal from the transmitter;

a deterrent circuit including a switched capacitor power supply for administering a deterrent to at least one of the animal and the human, the switched capacitor power supply responsive to a control signal from the receiver;

a first housing containing the receiver;

a second housing containing the deterrent circuit, the second housing separate from the first housing; and attaching means for attaching the first housing and the second housing to one of the animal and the human, the first housing coupled to the attaching means at a first position and the second housing coupled to the attaching means at a second position, wherein a profile of the attaching means is reduced.

41. A containment system for an animal or a human, the containment system including a transmitter for transmitting a predetermined radio signal, the containment system further comprising:

a receiver for receiving the radio signal from the transmitter;

a switched capacitor power supply for administering a deterrent to at least one of the animal and the human, the switched capacitor power supply responsive to a control signal from the receiver; and attaching means for attaching the receiver and the switched capacitor power supply to one of the animal and the human, the receiver coupled to the attaching means at a first position and the switched capacitor power supply coupled to the attaching means at a second position, wherein a combination of i) the attaching means, ii) the receiver, and iii) the switched capacitor power supply has low a profile.

* * * * *

UNITED STATES PATENT AND TRADEMARK OFFICE
CERTIFICATE OF CORRECTION

PATENT NO. : 6,201,477 B1
DATED : March 13, 2001
INVENTOR(S) : Yarnall Jr., et al.

It is certified that error appears in the above-identified patent and that said Letters Patent is hereby corrected as shown below:

Column 3,
Line 36, delete the first occurrence of "and."
Line 51, delete the second occurrence of "and."

Column 4,
Line 39, delete "thought" and insert -- through --.

Column 7,
Line 23, delete both occurrences of "mulitpliers" and insert in both occurrences -- multipliers --.
Line 27, delete "mulitpliers" and insert -- multipliers --.
Line 31, delete "mulitpliers mulitpliers" and insert -- multipliers multiplies --.
Line 34, delete "mulitpliers" and insert -- multipliers --.
Line 51, delete "sepreate" and insert -- separate --.

Column 9,
Line 5, delete both occurrences of "mulitpliers" and insert in both occurrences -- multipliers --.
Line 8, delete "mulitpliers" and insert -- multipliers --.
Line 12, delete "mulitpliers mulitpliers" and insert -- multipliers multiplies --.
Line 15, delete "mulitpliers" and insert -- multipliers --.

Signed and Sealed this

Sixteenth Day of October, 2001

Attest:

NICHOLAS P. GODICI
*Acting Director of the United States Patent and Trademark Office*

*Attesting Officer*